United States Patent [19]

Manz et al.

[11] Patent Number: 5,843,312

[45] Date of Patent: *Dec. 1, 1998

[54] CHROMATOGRAPHY MATERIAL

[75] Inventors: Thomas Manz; Jochen Tittgen, both of Bad Oeynhausen, Germany

[73] Assignee: Genomed, Germany

[*] Notice: This patent issued on a continued prosecution application filed under 37 CFR 1.53(d), and is subject to the twenty year patent term provisions of 35 U.S.C. 154(a)(2).

[21] Appl. No.: 702,659

[22] PCT Filed: Feb. 7, 1995

[86] PCT No.: PCT/EP95/00434

§ 371 Date: Oct. 23, 1996

§ 102(e) Date: Oct. 23, 1996

[87] PCT Pub. No.: WO95/22053

PCT Pub. Date: Aug. 17, 1995

[30] Foreign Application Priority Data

Feb. 8, 1994 [DE] Germany ............... 44 03 940.9

[51] Int. Cl.⁶ .................................................. B01D 15/08
[52] U.S. Cl. .................. 210/635; 210/656; 210/657; 210/658; 210/198.2; 536/25.4
[58] Field of Search ................... 210/635, 656, 210/657, 658, 659, 198.2, 198.3; 422/70; 436/161, 162; 502/401; 536/25.4

[56] References Cited

U.S. PATENT DOCUMENTS 4,029,583 6/1977 Ho Chang ..................... 210/502.1
4,049,496 9/1977 Henry ............................... 435/17
4,108,603 8/1978 Regnier .......................... 210/656
4,298,500 11/1981 Abbott ......................... 210/198.2
4,699,717 10/1987 Riesner ........................... 210/635

FOREIGN PATENT DOCUMENTS 0104210 4/1984 European Pat. Off. ......... 210/198.2
0268946 6/1988 European Pat. Off. ......... 210/198.2
3935098 4/1991 Germany ...................... 210/198.2
4217101 11/1993 Germany ...................... 210/198.2
90/08584 8/1990 WIPO ............................ 210/198.2
91/05606 5/1991 WIPO ............................ 210/198.2

OTHER PUBLICATIONS

Snyder, Introduction to Modern Liquid Chromatography, John Wiley & Sons, Inc, 1979, New York, pp. 484–485 & 493–494.

Snyder, Introduction to Modern Liquid Chromatography, John Wiley & Sons, New York, 1979, p. 838.

Primary Examiner—Ernest G. Therkorn
Attorney, Agent, or Firm—Klein & Szekeres, LLP

[57] ABSTRACT

A chromatography material is described for separation of nucleic acid mixtures in which a support is converted with a silanization reagent, in which the silanization reagent has a reactive group converted with silanization reagent, in which the silanization reagent has a reactive group converted with an alkyl- or dialkylamine, or contains a reactive group that can be converted with an alkyl- or dialkylamine, which is then reacted with the alkyl- or dialkylamine.

10 Claims, 2 Drawing Sheets

CHROMATOGRAPHY MATERIAL

CROSS-REFERENCE TO RELATED APPLICATION

This application is a 371 of PCT/EP95/00434 Feb. 7, 1995.

The invention concerns a chromatography material for separation of nucleic acid mixtures, as well as a chromatographic method for separation of nucleic acid mixtures.

Progress in biochemistry, molecular biology and human genetics and its applications in technology, medicine, pharmacy and genetic engineering require rapid and systematic separation and isolation of nucleic acids. For example, a common problem in molecular biology is that a specific nucleic acid must be isolated from a naturally occurring mixture of a hundred or more components, which is contained in this mixture in concentrations of less than 0.1%. The requirements on a chromatographic process therefore include, on the one hand, quantitative isolation of the nucleic acid and, on the other hand, quantitative separation of 99.9% impurities in order to purify the nucleic acid as molecular species up to homogeneity.

The known chromatography methods, however, are not satisfactory with respect to the attainable resolution of the nucleic acid mixture and the related purity of the nucleic acid being isolated. In known methods costly and cost-intensive equipment, like high-performance liquid chromatographs (HPLC) and/or ultracentrifuges, toxic substances, like phenol, chloroform or ethidium bromide, or substances that interfere in subsequent experiments, like RNAse or protease, are also frequently used.

A chromatographic support material from silica gel suitable for separation of proteins, peptides and nucleic acids is described in U.S. Pat. No. 4,029,583, to which a stationary phase with groups that form anion or cation exchangers is bonded by means of a silanization reagent, these groups interacting with the substances being separated. The silanized silica gel is brought into contact with water, during which there is a hazard that the stationary phase will polymerize and the chromatography material will become unusable.

According to EP-B 0 104 210 nucleic acid mixtures can be separated into their components if a chromatography material whose support is first converted with a silanization reagent having a flexible chain group is used, which in turn is again converted to a finished chromatography material by reaction with a reagent that forms an anion or cation exchanger. This known chromatography material separates nucleic acid mixtures using HPLC equipment. However, in long-chain nucleic acids the use of HPLC can lead to damage (for example degradation) of long-chain nucleic acids due to high shear forces.

A process for separation of long-chain nucleic acids is described in EP-B 0 268 946 in which long-chain nucleic acids are fixed on a porous anion exchanger. The anion exchanger described in EP-B 0 104 210 is used as anion exchanger. Satisfactory purity of the isolated nucleic acids, however, cannot be achieved.

A silanized chromatographic support is described in DE-A 39 35 098 in which the silanization reagent has at least one reactive group already converted with a primary or secondary hydroxylamine or contains a reactive group that can be converted with a hydroxylamine. Separation of nucleic acids in HPLC using a continuous salt gradient has been demonstrated with this material (example 5).

However, the separation performance of known materials is not sufficient to solve difficult separation problems with simple chromatographic methods that operate with a specified number of theoretical plates, like simple column chromatography in which flow of the mobile phase is produced by shear force, separations in spin columns (to be used in a centrifuge), in which flow of the mobile phase is produced by centrifugal force, or batch methods in which the chromatography material is in suspension and with avoidance of a continuous salt gradient, i.e., using a step gradient. In particular, simple column chromatographic methods according to the prior art often produced incomplete separations during isolation of DNA from cultures of transformed bacteria in which very limited amounts of DNA must be separated from RNA in a more than thousand-fold excess. It is usually recommended in such cases that the RNA present in high excess be destroyed by RNAse-digestion to ribonucleotides and shorter RNA fragments before chromatographic separation.

However, this type of procedure has two critical shortcomings. In the first place, it is impossible to use the RNA in subsequent experiments because of its destruction. On the other hand, there is a hazard of contamination of the laboratory, equipment and the isolated DNA itself during use of RNAse in the recommended concentrations of 100–400 $\mu$g/mL. Contamination with even the most limited amounts of RNAse leads to a threatening of RNA-forming subsequent experiments, like in vitro transcription, or subsequent experiments in which RNA participates, like Northern hybridization and other solid phase hybridizations, like hybrid selection.

On the other hand, during separation without RNAse digestion contamination of RNA in the isolated DNA leads to hampering or prevention of subsequent experiments, like sequencing with fluorescence markers or with radioactive labeling, as well as all reactions initialized by "priming", for example all types of PCR.

The underlying task of the present invention is therefore to provide a chromatography material for separation of nucleic acid mixtures with which the nucleic acids being isolated can be isolated in the highest purity, fully dispensing with the use of toxic substances and RNAse, as well as performance of separation with demanding and cost-intensive equipment.

This task is solved with the features of the invention.

The present invention concerns a chromatography material for separation of nucleic acid mixtures in which a support is converted with a silanization reagent, which is characterized by the fact that the silanization reagent has a reactive group converted with an alkyl- or dialkylamine, or contains a reactive group that can be converted with an alkyl- or dialkylamine, which is then reacted with the alkyl- or dialkylamine.

The application discloses preferred variants of the chromatography material according to the invention.

The invention also concerns a process for separation of nucleic acid mixtures with the chromatography material according to the invention.

BRIEF DESCRIPTION OF THE DRAWINGS

The invention is explained by the figures. In them

DESCRIPTION OF THE PREFERRED EMBODIMENTS

Figure 1:
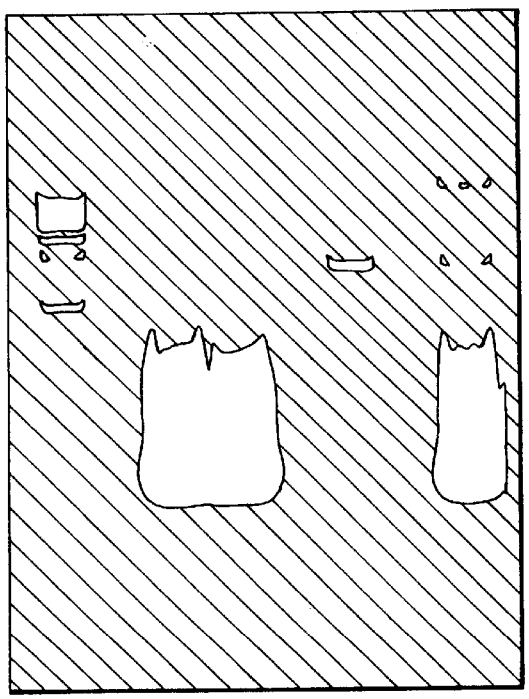
FIG. 1 shows separation of mixture components on an agarose gel using the chromatography material according to the invention.

It has turned out surprisingly that nucleic acid mixtures can be separated with high efficiency with the chromatography material according to the invention. Thus, for example, it is possible to isolate DNA with the highest purity, i.e., without RNA fractions, from mixtures that contain only very limited amounts of DNA in addition to large amounts of RNA. The use of toxic substances, like phenol, chloroform or ethidium bromide can be fully dispensed with. Moreover, the chromatography material according to the invention can be used in technically simple chromatographic methods, like simple column chromatography, separations in spin columns or separations in batch methods in which the chromatography material is in suspension or fixed on the reaction vessel, microtiter plates, pipette tips, agitator rods or test strips, so that separation of nucleic acids can be carried out without using demanding and cost-intensive equipment, for example, HPLC or ultracentrifuging. Rapid group separation of RNA and DNA in a simple column chromatography or a batch process is made possible, in particular avoiding RNAse.

Any appropriate support can be used as carrier. Silica gel, aluminum oxide, titanium dioxide, porous glass or a polymer support have proven to be particularly suitable.

The support can have a particle size from 1 to 500 μm and a pore diameter from 3 to 400 nm and consist of a porous or nonporous material. Supports with a particle size from 63 to 200 μm and a pore diameter from 3 to 30 nm are particularly suitable, in which a pore diameter from 4 to 6 nm is preferred.

Modification of the support for the chromatography material according to the invention can occur in a one- or two-stage reaction. In the one-stage reaction the support is converted with a silanization reagent that already contains an alkyl- or dialkylamino group. In the two-stage reaction the support is first converted with a silanization reagent that contains a reactive group after coupling to the support, which is made to react in a second synthesis step with an alkyl- or dialkylamine.

The silanization reagent with which the support is converted has the general formula

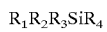

in which
R$_1$ denotes an alkoxy group with 1 to 10 carbon atoms, a halogen atom or a dialkylamino group with alkyl groups having 1 to 6 carbon atoms,
R$_2$ and R$_3$ denote a hydrocarbon group with 1 to 10 carbon atoms, an alkoxy group with 1 to 10 carbon atoms, a halogen atom, a dialkylamino group with alkyl groups having 1 to 6 carbon atoms or an alkyl group interrupted by at least one oxa or amino group with 4 to 20 carbon atoms, in which this group can also be mono- or multiply substituted with halogen atoms, cyano, nitro, amino, monoalkylamino, hydroxy or aryl groups and
R$_4$ in a one-stage synthesis represents a hydrocarbon group with 1 to 20 carbon atoms or an alkyl group interrupted by at least one oxa or amino group, in which this group can be mono- or multiply substituted with halogen atoms, cyano, amino, alkoxy, hydroxy, aryl or epoxy groups and contains an alkyl- or dialkylamino group in which a group with the formula

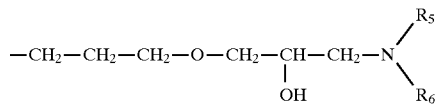

is particularly preferred, in which
R$_5$ and R$_6$ denote alkyl groups with 1 to 10 carbon atoms, in which R$_5$ or R$_6$ can also be a hydrogen atom, or
R$_4$ in a two-stage synthesis is a hydrocarbon group with 1 to 20 carbon atoms or an alkyl group interrupted by at least one oxa or amino group, in which this group can be mono- or multiply substituted with halogen atoms, cyano, amino, alkylamino, dialkylamino, alkoxy, hydroxy, aryl or epoxy groups.

In the two-stage synthesis the flexible chain grouping R$_4$ that causes interaction with the substance being separated is then modified by reaction with an alkyl- or dialkylamine to form an anion exchanger.

In a preferred variant of the invention diethylamine or dimethylamine is used as dialkylamine.

In the one-stage synthesis a silanization reagent is used in a preferred variant in which R$_5$ and R$_6$ denote a methyl group.

In a preferred variant the reactive group converted or to be converted with the alkyl- or dialkylamine is the 3-glycidoxypropyl group.

Silanization of the support preferably occurs under anhydrous conditions in order to prevent polymerization of the silanization reagent.

It is possible with the chromatography material according to the invention to separate nucleic acid mixtures with high efficiency without costly technical equipment, like HPLC, and with avoidance of addition of RNAse. Lysates of transformed bacteria can be mentioned as examples of a nucleic acid mixture to be separated, in which complete group separation into RNA and DNA occurs. Moreover, it is possible to separate phagemid-DNA, phage-DNA, cosmid-DNA, genomic DNA, YAC-DNA, fragmented DNA, tRNA, mRNA, hnRNA, snRNA, viral DNA or viroid DNA with the chromatography material according to the invention.

Separation of nucleic acid mixtures with the chromatography material according to the invention occurs with a simple step gradient by washing of the column loaded with nucleic acid mixture and subsequent elution of the desired nucleic acid with an appropriate buffered salt solution. Most of the RNA is separated during binding of the DNA to the chromatography material according to the invention, whereupon any remaining RNA is rinsed out during the washing process. Treatment with RNAse is thus unnecessary.

The chromatography material according to the invention can be marketed in different ways. For example, it is possible to offer the chromatography material according to the invention as a kit together with the equipment required for chromatography. Other commercial forms are naturally included.

The invention is explained by the following examples without being limited to them.

EXAMPLES

Example 1

100 g of silica gel with a pore diameter of 6 nm and a specific surface of 500 m²/g is mixed in 600 mL of dry xylene with 62 g of a silane with the formula

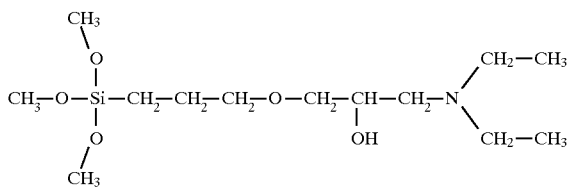

degassed by three-fold application of a vacuum and subsequent pressurization with nitrogen and heated at 120° C. with exclusion of air and moisture for 2 hours. The modified silica gel was filtered off, washed repeatedly with xylene and tetrahydrofuran and then dried at 70° C. in vacuum.

Example 2

100 g of silica gel with a pore diameter of 4 nm and a specific surface of 750 m²/g is mixed in 600 mL of dry xylene with 46 g of 3-glycidoxypropyltrimethoxysilane and 0.1 mL triethylamine. The reaction mixture is degassed by three-fold application of a vacuum and subsequent pressurization with nitrogen and heated at 130° C. with exclusion of air and moisture for 4 hours. It is filtered off and washed with xylene and tetrahydrofuran. The modified silica gel is dried at 50° C. in vacuum.

The product is then mixed with 600 mL dioxane and 32 g diethylamine and heated for 18 hours under reflux. The product is washed with dioxane and methanol and dried in vacuum at 70° C.

Example 3

100 g of silica gel with a pore diameter of 30 nm and a specific surface of 60 m²/g is converted in 600 mL with dry xylene with 7.36 g 3-glycidoxypropyltrimethoxysilane, as in example 2. The dried intermediate is heated under reflux for 15 hours in 200 mL of a 5.6M solution of diethylamine in absolute ethanol. The product is washed with methanol and dried in vacuum at 70° C.

Example 4

200 mg of the modified end product from example 1 is filled into a commercial solid phase extraction column (polypropylene-acid with HDPE frits) with a volume of 4 mL.

The separation performance of the material is demonstrated with reference to isolation of plasmid DNA from the cell lysate of pBR322 transformed RR-I E. coli cells.

Reference is made in the methods described here to T. Maniatis, E. F. Fritsch, J. Sambrook, "Molecular cloning", Cold Spring Harbour Laboratory Press, 1989.

10 mL of an RR-I E. coli culture transformed with pBR322, which was cultured in LB-ampicillin medium to a cell density of $9.84 \cdot 10^8$ cells/mL, is centrifuged at 4000 g for 10 minutes. The supernatant is carefully removed and the bacteria pellet resuspended in 300 μL of a solution of 50 mM Tris-HCl pH 8.0 and 10 mM EDTA. The bacterial suspension is mixed with 300 mL of a solution of 0.2M NaOH, 1% sodium dodecylsulfate and incubated for 5 minutes at room temperature. 300 mL of a solution of 3.3M potassium acetate, pH 5.5, is then added. The precipitated potassium dodecylsulfate is separated by centrifuging at 4° C. and 10,000 g. The solid phase extraction column containing the anion exchanger is conditioned by applying 1 mL of a solution of 600 mM NaCl, 100 mM NaAc, pH 5.0, and 0.15% Triton X-100. The clear supernatant of potassium dodecylsulfate centrifuging (cleared lysate) is applied to the column. The column is then washed twice with 2 mL of a solution of 800 mM NaCl. 100 mM NaAc, pH 5.0. The plasmid DNA bonded to the anion exchanger is then eluted with a solution of 1250 mM NaCl Tris-HCl, pH 8.5.

Both the passage of cell lysate and the two wash solutions and the eluate are precipitated in each case by addition of 0.7 volume of isopropanol and pelletized by centrifuging for 30 minutes at 4° C. and 10,000 g. The supernatant is then discarded, whereupon the nucleic acid pellets are washed in 70% ethanol and then dissolved in TE, pH 8.0.

FIG. 1 shows separation of the mixture components on 1% TAE agarose gel. The following components were applied in the individual traces:

Trace 1: 1 kb ladder (Gibco BRL) as length standard;
Trace 8: 20% of the cleared lysate applied to the column. It corresponds to the DNA/RNA mixture being separated before separation as reference. The band for the plasmid DNA is only colored and shows strong "smiling" owing to the enormous amount of RNA;
Trace 3: 20% of the passage. It corresponds to the cleared lysate after binding to the anion exchanger column;
Trace 4: 20% of the first wash solution;
Trace 5: 20% of the second wash solution;
Trace 6: 20% of the elution solution.

Complete separation of the nucleic acid mixture components is apparent in the eluate in trace 6. which only shows plasmid DNA without contamination with RNA.

Spectrophotometric concentration determinations of RNA and plasmid DNA in the passage, wash solutions and eluate show that the test mixture being separated consists of 1795.6 μg RNA and 2.795 μg plasmid DNA. DNA contained only in an amount of 0.16% in the nucleic acid mixture can therefore be isolated quantitatively in high purity.

Comparative Example 1

A nucleic acid mixture similar to that described in example 4 is separated with the commercially available plasmid isolation kit "Qiagen Plasmid Mini Kit" from the Diagen Co. GmbH (Hilden), product no. 12123, in which processing to the cleared lysate according to the product description, the only exception being that no RNAse treatment occurs.

A column containing the known ion exchanger is conditioned by applying 1 mL of a solution of 750 mM NaCl, 50 mM MOPS, pH 7.0, 15% ethanol, 0.15% Triton X-100.

The clear supernatant of potassium dodecylsulfate centrifuging (cleared lysate) is applied to the column. The column is then washed twice with 2 mL of a solution of 1M NaCl, 50 mM MOPS, 15% ethanol, pH 7.0. The plasmid DNA bonded to the ion exchanger is eluted with a solution of 1250 mM NaCl, Tris-HCl, 15% ethanol, pH 8.5.

Both the passage of the cell lysate and the two wash solutions and eluate are precipitated in each case by addition of 0.7 volume isopropyl and pelletized by centrifuging at 4° C. and 15,000 g for 30 minutes. The supernatant is then discarded, whereupon the nucleic acid pellets are washed with 70% ethanol and then dissolved in TE, pH 8.0.

Figure 2:
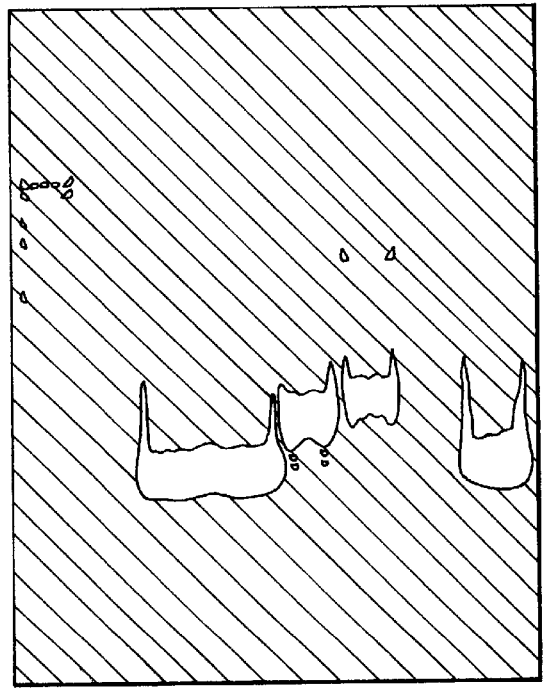
FIG. 2 shows separation of the mixture components on an agarose gel using a chromatography material according to the prior art.

FIG. 2 shows separation of the mixture components on a 1% TAE agarose gel. The following components were applied in the individual traces:

Trace 1: 1 kb ladder (Gibco BRL) as length standard;

Trace 8: 20% of the cleared lysate applied to the column. It corresponds to the DNA/RNA mixture being separated before separation as reference. The band for the plasmid DNA is only weakly colored and shows strong "smiling" because of the enormous amount of RNA;

Trace 3: 20% of the passage;

Trace 4: 20% of the first wash solution;

Trace 5: 20% of the second wash solution;

Trace 6: 20% of the elution solution.

As is apparent from FIG. 2, clean separation of the mixture components does not occur. The eluate (trace 6) still contains a significant RNA fraction in addition to plasmid DNA.

Spectrophotometric studies of the eluate show that 65 $\mu$g of RNA is still present in addition to the expected 3 $\mu$g of plasmid DNA.

Comparative Example 2

A second separation is conducted with the isolated eluate from comparative example 1 with the modified chromatography material according to the invention from example 1.

The precipitated eluate obtained in comparative example 1 is dissolved in 450 $\mu$L TE, pH 8.0 and mixed with 450 $\mu$L of a solution of 800 mM NaCl, 100 mM NaAc, pH 5.0. This DNA/RNA mixture is applied in similar fashion to example 4 to a conditioned column, washed twice with 2 mL of a solution of 800 mM NaCl, 100 mM NaAc, pH 5.0, and then eluted.

Both the eluate according to comparative example 1 and the two wash solutions and eluate are precipitated in each case by addition of 0.7 volume isopropyl and pelletized by centrifuging at 4° C. and 15,000 g for 30 minutes. The supernatant is then discarded, whereupon the nucleic acid pellets are washed with 70% ethanol and then dissolved in TE, pH 8.0.

Figure 3:
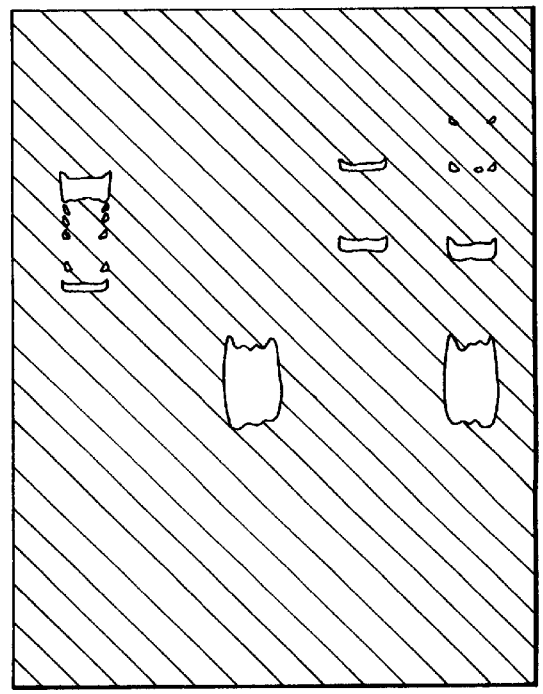
FIG. 3 shows separation of the mixture components on an agarose gel using the chromatography material of FIG. 2 and the chromatography material of the invention.

FIG. 3 shows separation of the mixture components on a 1% TAE agarose gel. The following components were applied in the individual traces:

Trace 1: 1 kb ladder (Gibco BRL) as length standard;

Trace 8: 20% of the eluate according to comparative example 1 as reference;

Trace 3: 20% of the passage;

Trace 4: 20% of the first wash solution;

Trace 5: 20% of the second wash solution:

Trace 6: 20% of the elution solution.

As is apparent from FIG. 3, the eluate of separation according to comparative example 1, which was subjected again to separation with the chromatography material according to the invention is completely separated into its components RNA (trace 4) and DNA (trace 6).

Comparative Example 3

A nucleic acid mixture similar to that described in example 4 is separated with another commercially available plasmid isolation kit "Nukleobon AX Kit PC 20-1" from Macherey-Nagel GmbH & Co. (Duren), product no. 730 571, in which processing to cleared lysate occurred according to the product description, the only exception being that no RNAse treatment was used.

A column containing the ion exchanger is conditioned by applying 1 mL of a solution of 900 mM KCl, 100 mM Tris/H$_3$PO$_4$, pH 6.3, 15% ethanol.

The clear supernatant of potassium dodecylsulfate centrifuging (cleared lysate) is applied to the column. The column is then washed twice with 2 mL of a solution of 1.3M KCl, 100 mM Tris/H$_3$PO$_4$, 15% ethanol, pH 6.3. The plasmid DNA bonded to the ion exchanger is eluted with a solution of 1000 mM KCl, Tris-H$_3$PO$_4$, 15% ethanol, pH 8.5.

Both the passage of the cell lysate and the two wash solutions and eluate are precipitated in each case by addition of 0.7 volume isopropanol and pelletized by centrifuging at 4° C. and 15,000 g for 30 minutes. The supernatant is discarded, whereupon the nucleic acid pellets are washed with 70% ethanol and then dissolved in TE, pH 8.0.

Figure 4:
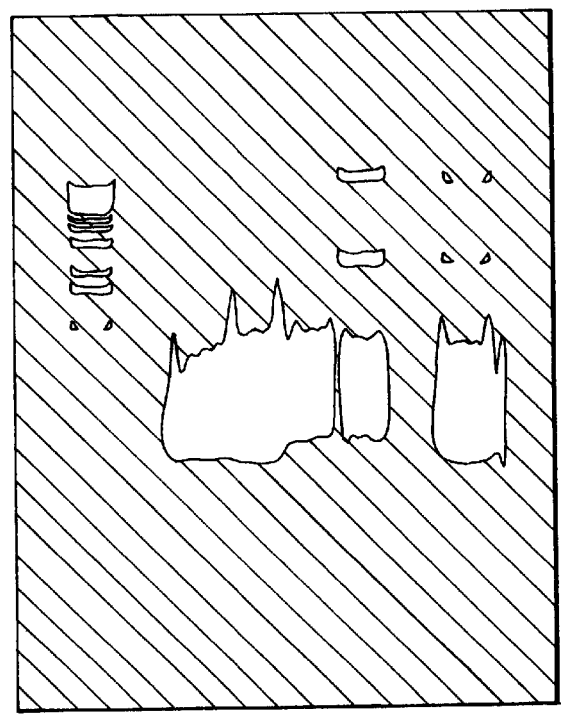
FIG. 4 shows separation of the mixture components on an agarose gel using a chromatography material according to another prior art.

FIG. 4 shows separation of the mixture components on a 1% TAE agarose gel. The following components were applied in the individual traces:

Trace 1: 1 kb ladder (Gibco BRL) as length standard;

Trace 8: 20% of the cleared lysate applied to the column. It corresponds to the DNA/RNA mixture being separated before separation as reference. The band for the plasmid DNA is only weakly colored and shows strong "smiling" because of the enormous amount of RNA;

Trace 3: 20% of the passage;

Trace 4: 20% of the first wash solution;

Trace 5: 20% of the second wash solution:

Trace 6: 20% of the elution solution.

It is apparent from FIG. 4 that clean separation of the mixture components does not occur. The eluate (trace 6) still contains a significant RNA fraction in addition to plasmid DNA.

Spectrophotometric studies of the eluate show that 15.94 $\mu$g of RNA is still present in addition to the expected 3 $\mu$g of plasmid DNA.

Comparative Example 4

A second separation was carried out with the isolated eluate from comparative example 3 with the modified chromatography material according to the invention from example 1.

The precipitated eluate obtained in comparative example 3 is dissolved in 450 $\mu$L TE, pH 8.0 and mixed with 450 $\mu$L of a solution of 800 mM NaCl, 100 mM NaAc, pH 5.0. This DNA/RNA mixture is applied in similar fashion to example 4 to a conditioned column, washed twice with 2 mL of a solution of 800 mM NaCl, 100 mM NaAc, pH 5.0, and then eluted.

Of the eluate according to comparative example 3 and the two wash solutions and eluate are precipitated in each case by addition of 0.7 volume isopropanol and pelletized by centrifuging at 4° C. and 15,000 g for 30 minutes. The supernatant is then discarded, whereupon the nucleic acid pellets are washed in 70% ethanol and then dissolved in TE, pH 8.0.

Figure 5:
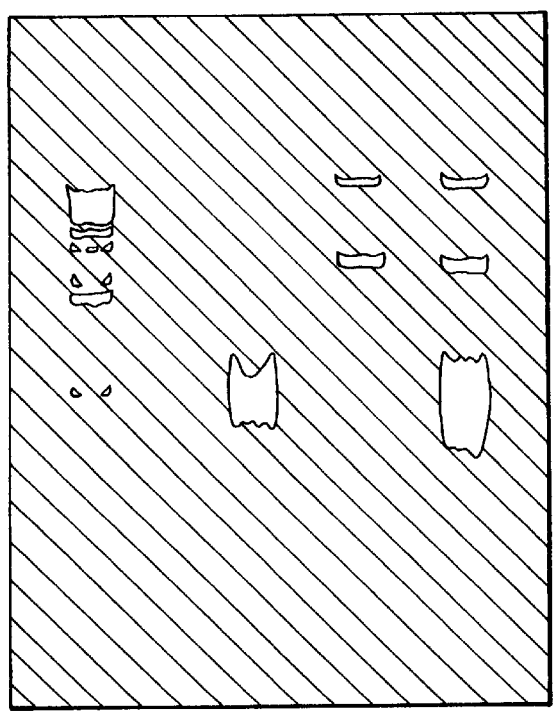
FIG. 5 shows separation of the mixture components on an agarose gel using the chromatography material of FIG. 4 and the chromatography material according to the invention.

FIG. 5 shows separation of the mixture components on a 1% TAE agarose gel. The following components were applied in the individual traces:

Trace 1: 1 kb ladder (Gibco BRL) as length standard;

Trace 8: 20% of the eluate of a separation according to the prior art similar to comparative example 3 as reference;

Trace 3: 20% of the passage;

Trace 4: 20% of the first wash solution;

Trace 5: 20% of the second wash solution;

Trace 6: 20% of the elution solution.

As is apparent from FIG. 5, the eluate of separation according to the prior art (trace 8) is fully separated into its components RNA (trace 4) and DNA (trace 6) by an additional separation with the chromatography material according to the invention.

We claim:

1. A process for chromatographic separation of DNA from RNA of a mixture wherein both RNA and DNA are present, with chromatography material wherein the chromatography material comprises:

a support that has been reacted with a silanization agent selected from the group consisting of
(1) a silanization reagent having a reactive group converted with an alkyl- or dialkylamine and
(2) a silanization reagent that contains a reactive group that can be converted with an alkyl- or dialkylamine, which support has thereafter been reacted with the alkyl- or dialkylamine, said support having a particle size of 1 to 500 µm and a pore diameter between 3 to 6 nm, the process comprising the steps of:
loading the mixture on the chromatography material;
washing the loaded chromatographic material, and
applying an eluent comprising a salt solution to the chromatographic material.

2. The process of claim 1 wherein the chromatographic separation is carried out in a simple column chromatography, spin columns, batch method in which the chromatography material is in suspension or is fixed on reaction vessels, microtiter plates, pipette tips, agitator rods or test strips.

3. The process according to claim 1 wherein the chromatographic separation is carried out in a step gradient.

4. The process according to claim 1 wherein no RNAase is used.

5. The process according to claim 1 wherein the support is selected from the group consisting of silica gel, aluminum oxide, titanium dioxide, porous glass and polymeric material.

6. The process according to claim 1 wherein the support has a pore diameter from 4 to 6 nm.

7. The process according to claim 1 wherein the support has a particle size from 63 to 200 µm.

8. The process according to claim 1 wherein the reactive group converted or to be converted with the alkyl or dialkylamine is the 3-glicidoxypropyl group.

9. The process according to claim 1 wherein a dialkylamine is used to convert the reactive group, and wherein the dialkylamine is diethylamine or dimethylamine.

10. The process according to claim 1 wherein the support has been reacted with the silanization agent under anhydrous conditions.

* * * * *

UNITED STATES PATENT AND TRADEMARK OFFICE
CERTIFICATE OF CORRECTION

PATENT NO. : 5,843,312
DATED : December 1, 1998
INVENTOR(S) : Manz et al.

It is certified that error appears in the above-identified patent and that said Letters Patent is hereby corrected as shown below:

Column 5,
Line 18, "120° C." should be -- 120°C --.
Line 21, "70° C." should be -- 70°C --.
Line 29, "130° C." should be -- 130°C --.
Line 32, "50° C." should be -- 50°C --.
Lines 36 and 45, "70° C." should be -- 70°C --.

Column 6,
Lines 2 and 15, "4° C." should be -- 4°C --.
Line 33, "." should be -- , --.
Lines 61-62, "4° C." should be -- 4°C --.

Column 7,
Line 35, "4° C." should be -- 4°C --.

Column 8,
Lines 10 and 51, "4° C." should be -- 4°C --.

Signed and Sealed this

Twenty-eighth Day of January, 2003

JAMES E. ROGAN
*Director of the United States Patent and Trademark Office*